(12) United States Patent
Hickish et al.

(10) Patent No.: US 12,484,784 B2
(45) Date of Patent: Dec. 2, 2025

(54) DEVICE, SYSTEM AND METHOD FOR VIBRATION SENSITIVITY ASSESSMENT

(71) Applicant: BU Innovations Limited, Bournemouth (GB)

(72) Inventors: Tamash Frederick Gordon Hickish, Bournemouth (GB); Venketesh Nath Dubey, Bournemouth (GB); Neil Vaughan, Bournemouth (GB); Jonathan David Cole, Bournemouth (GB)

(73) Assignee: BU Innovations Limited, Bournemouth (GB)

( * ) Notice: Subject to any disclaimer, the term of this patent is extended or adjusted under 35 U.S.C. 154(b) by 975 days.

(21) Appl. No.: 17/497,727

(22) Filed: Oct. 8, 2021

(65) Prior Publication Data
US 2022/0095922 A1   Mar. 31, 2022

Related U.S. Application Data

(62) Division of application No. 15/575,097, filed as application No. PCT/GB2016/051405 on May 16, 2016, now abandoned.

(30) Foreign Application Priority Data

May 18, 2015   (GB) ..................................... 1508513

(51) Int. Cl.
*A61B 5/00*       (2006.01)
(52) U.S. Cl.
CPC .......... *A61B 5/0051* (2013.01); *A61B 5/4041* (2013.01); *A61B 5/4827* (2013.01); *A61B 5/6898* (2013.01); *A61B 2560/045* (2013.01)

(58) Field of Classification Search
CPC ... A61B 5/0051; A61B 5/4041; A61B 5/4827; A61B 5/6898; A61B 5/4029
See application file for complete search history.

(56) References Cited

U.S. PATENT DOCUMENTS 5,854,970 A * 12/1998 Kivela ................. H04B 1/3833
343/702
5,931,793 A     8/1999 Laudadio
(Continued)

FOREIGN PATENT DOCUMENTS

CN     1835709 A     9/2006
CN     1914583 A     2/2007
(Continued)

OTHER PUBLICATIONS

First Office Action for NZ Appl. No. 73861 dated Jun. 20, 2022.
(Continued)

*Primary Examiner* — Alex M Valvis
*Assistant Examiner* — Yasmeen S Warsi
(74) *Attorney, Agent, or Firm* — Stoel Rives LLP

(57) ABSTRACT

A device, system and method for vibration sensitivity assessment are provided. the device has an attachment portion configured to detachably connect the device to a programmable vibration source and a probe configured to be applied to a test location on a test subject's skin and to convey vibrations generated by the programmable vibration source to the test location. The programmable vibration source may for example be a mobile telephone. A low-cost and widely usable device for vibration sensitivity assessment is thus provided.

19 Claims, 12 Drawing Sheets

(56) References Cited

U.S. PATENT DOCUMENTS

| | | | |
|---|---|---|---|
| 2004/0176037 A1* | 9/2004 | Vicendese | H04M 1/21 |
| | | | 455/66.1 |
| 2005/0124910 A1* | 6/2005 | Gupta | A61B 5/0051 |
| | | | 128/903 |
| 2006/0215013 A1 | 9/2006 | Jongsma et al. | |
| 2008/0204266 A1 | 8/2008 | Malmberg et al. | |
| 2011/0082384 A1* | 4/2011 | Harte | A61B 5/4827 |
| | | | 600/557 |
| 2011/0166473 A1 | 7/2011 | Hasbun | |
| 2013/0245491 A1 | 9/2013 | Nikzad | |
| 2013/0293731 A1 | 11/2013 | Kim | |
| 2014/0148727 A1 | 5/2014 | O'Brien | |
| 2014/0378810 A1* | 12/2014 | Davis | G06F 16/248 |
| | | | 600/407 |
| 2016/0143534 A1 | 5/2016 | Hyde et al. | |
| 2018/0153406 A1 | 6/2018 | Hickish et al. | |

FOREIGN PATENT DOCUMENTS

| | | |
|---|---|---|
| CN | 1997310 A | 7/2007 |
| CN | 201958883 U | 9/2011 |
| CN | 104468890 A | 11/2014 |
| CN | 104540454 A | 4/2015 |

OTHER PUBLICATIONS

First Office Action for Canadian Appl. No. 2,986,183 dated Jul. 27, 2022.

Combined Search and Examination Report received for GB1508513.7 Dated Oct. 26, 2015.

English translation of Office Action for Application No. 201680028725.9, dated Jan. 22, 2020.

English translation of Office Action for CN Application No. 201680028725.9, dated Sep. 18, 2020.

English translation of Third Office Action for Chinese Application No. 201680028725.9, dated Apr. 2, 2021.

International Preliminary Report on Patentability for PCT Application No. PCT/GB2016/051405, dated Aug. 18, 2017.

International Search Report and Written Opinion received for PCT Appl. PCT/GB2016/051405 dated Aug. 4, 2016.

Office Action received in Indian App. No. 201717045180 dated Feb. 11, 2021.

U.S. Appl. No. 15/575,097, entitled "A Device, System and Method for Vibration Sensitivity Assessment", filed Nov. 17, 2017, pp. all.

* cited by examiner

DEVICE, SYSTEM AND METHOD FOR VIBRATION SENSITIVITY ASSESSMENT

CROSS-REFERENCE TO RELATED APPLICATION(S)

This application is a divisional application of U.S. application Ser. No. 15/575,097, filed Nov. 17, 2021, which is a 35 U.S.C. § 371 National Stage Application of PCT Application No. PCT/GB2016/051405, filed on May 16, 2016, which claims the filing benefit of United Kingdom Application No. 1508513.7, filed on May 18, 2015. Both applications are hereby incorporated by reference in their entirety and for all purposes.

TECHNICAL FIELD

The present disclosure relates to devices for testing a subject's sensitivity to vibration, in particular for the assessment of neuropathy.

BACKGROUND

Neuropathy—the degradation of an individual's nerves—resulting in impaired sensation, movement or function is a serious issue in a number of medical contexts. For example, peripheral sensory neuropathy may cause a reduction in an individual's sensitivity to touch and vibration, or to temperature change and pain, and may in itself be the source of tingling, irritation, or even painful sensations. On the one hand such neuropathy may be the result of a disease such as diabetes or leprosy, but can also result from medical intervention to treat a condition which itself is not a cause of neuropathy, such as chemotherapy or radiation therapy to treat various types of cancer. Whatever the cause of the neuropathy, it is of significant medical importance for a clinician to be able to assess the degree and extent of neuropathy in a patient, both to monitor disease progression, and/or to monitor the extent to which such neuropathy is being generated as a side effect of medical treatment.

Various point-of-care-testing (POCT) systems for the diagnosis and grading of peripheral neuropathy are known. These include a traditional hospital-based neurothesiometer which a clinician may use to determine a vibration sensitivity threshold at a particular site on a patient's body. For example, peripheral neuropathy is known to commonly affect extremities such as toes and fingertips. Another known technique for the assessment of peripheral neuropathy is the use of a monofilament, wherein a fine filament of predetermined physical strength is applied to a test location and sufficient force is applied to cause the filament to bend, and it is determined if the patient was able to sense the pressure applied by the monofilament to that test location. A range of thicknesses of monofilaments can be used to generate a range of test pressures. Tuning forks have also be used to provide a source of vibration which can be used to be applied to a test location and determine if the patient is able to sense the vibration of the tuning fork. More recently, other devices based on vibration sensitivity assessment have been developed in a range of shapes and sizes which a clinician may use to apply a vibration to a test location on a patient's skin in order to determine if the patient can feel that vibration.

US2011/166473 discloses a portable diagnostic instrument and a method for its use, wherein the portable diagnostic instrument can maintain the frequency of sound or vibration produced by the device constant, even when battery power is reduced. U.S. Pat. No. 5,931,793 discloses a vibration pocket device utilized for detecting severe neuropathy.

SUMMARY

Viewed from a first aspect the present techniques provide a device for vibration sensitivity assessment comprising: an attachment portion configured to detachably connect the device to a programmable vibration source; and a probe configured to be applied to a test location on a test subject's skin and to convey vibrations generated by the programmable vibration source to the test location.

The inventors of the present device have realised that it is advantageous to provide a simple, low-cost device formed as an attachment to a programmable vibration source in the context of enabling vibration sensitivity assessment to be carried out. This is in particular due to the fact that, because the device itself is provided independently of the programmable vibration source (although of course is then combined with the programmable vibration source in order to enable the vibration sensitivity assessment to be carried out), the device can be relatively small, manufactured without great expense, disposable (of particular use in the clinical setting) and be provided in various configurations (with associated particular benefits of each configuration) relatively cheaply.

The programmable vibration source may take a variety of forms, which generate vibrations of an amplitude and frequency which are suitable for being conveyed by the device to the test subject's skin. However, the inventors of the present invention have realised that convenient programmable vibration source may be provided by a mobile telephone.

The probe may take a variety of shapes, forms, and sizes, but in some embodiments the probe comprises a helical portion. One characteristic of a helix that may be made use of in the context of the present invention is its natural resonance (in particular having a characteristic frequency), which can be selected (by appropriate choice of the dimensions of the helix, the material from which the probe is made, and so on) in order to convey the vibrations from the programmable vibration source to the test subject's skin in a manner which is appropriate to the clinical assessment of vibration sensitivity.

This manner in which the vibration are conveyed may for example comprise a dampening effect, such that the amplitude of the vibrations generated by the programmable vibration source are reduced by the time they reach the test location. Accordingly in some embodiments, the helical portion is configured to dampen vibrations generated by the programmable vibration source.

Alternatively, in dependence on the characteristics of the vibrations generated by the programmable vibration source, and the desired characteristics of the vibrations which should be applied to be test location, it may be that an enhancement of the vibrations is desired. Accordingly in some embodiments, the helical portion is configured to resonate with vibrations generated by the programmable vibration source.

The probe may be variously configured, both in terms of its shape, form and size, but also in terms of the material from which it is manufactured. The probe may be metallic, non-metallic, or a combination of the two.

The portion of the probe which makes contact with the test location on the test subject's skin may be variously configured in dependence on the clinical requirements. For example, a differently shaped probe may be provided for use at different test locations, where the vibration sensitivity assessment is to be carried out. In the context of the assessment of peripheral neuropathy, it is common for this assessment to be made at the fingertips (or more generally in the fingers in the event of more severe peripheral neuropathy), at other locations on the hand, at the knees and on the toes (or more generally around the feet in the event of more severe peripheral neuropathy). One configuration of the probe may be used for each location, or a different configuration may be used for a least one different location.

In some embodiments a proximal end of the probe connects to the attachment portion and a distal end of the probe tapers to a point. A pointed probe allows a more precise test location to be tested, but will also convey the test vibrations correspondingly specifically, which may be useful in the focussed assessment of that test location (as long as the patient can tolerate any greater intensity which results).

Other configurations of the distal end of the probe may also be provided, for example as a relatively flat, blunt end of the probe. In some embodiments a proximal end of the probe connects to the attachment portion and a distal end of the probe is rounded. This rounding of the distal end probe may be more pleasantly perceived by the patient. In some embodiments the rounded distal end of the probe is provided by a substantially spherical portion. This may for example be a true "ball" forming the distal portion of the probe, or may more generally be a variety of rounded lump.

As mentioned above, the probe may be manufactured from a range of materials, and one particular parameter which is of significance when selecting the material or materials for the probe is its ability to convey the vibrations. In addition, in some embodiments a dampening of the vibrations conveyed by the probe may be provided by adding at least one pad to the end of the probe. This may for example enable a degree of fine tuning of the dampening to be made, even after manufacture of the probe, or may for example be used in order to adjust the vibration conveying characteristics of the probe for a patient who has particularly good vibration sensitivity and therefore maybe be able to sense vibrations of a much lower intensity. Accordingly in some embodiments the probe comprises at least one detachable pad configured to dampen the vibrations generated by the programmable vibration source.

In addition to the selection of the material from which the probe is made, the vibration conveying characteristics of the probe can be selected by varying the density of the material from which the probe is manufactured. Accordingly in some embodiments the probe has a non-uniform density. For example, the distal end of the probe (i.e. essentially that part of the probe which contacts the patient's skin) may have a different (e.g. lower) density than the remainder of the device.

Since the device itself does not have any vibration generating ability, it can be easily manufactured, typically as a single piece, at low cost. There are various ways in which this could be done, but in some embodiments the device is formed as a single piece, wherein the single piece has been manufactured by at least one of the techniques of: 3D printing; injection moulding; and milling.

The attachment portion of the device may also be configured to modify the vibrations generated by the programmable vibration source and accordingly in some embodiments the attachment portion is configured to dampen vibrations generated by the programmable vibration source. This may for example be effected by the choice of material from which the attachment portion is made, the density of that material, the particular form which the attachment portion takes (i.e. the manner in which it attaches to the programmable vibration source) and/or how tightly the attachment portion grips the programmable vibration source.

These choices of material, density form and/or tightness of grip may of course also be selected to enhance the efficiency with which the vibrations are transferred from the programmable vibration source to the device. In some embodiments the attachment portion is configured to directly contact a metallic rim of the programmable vibration source. This may for example be the metallic rim which is typically found around the periphery of a mobile telephone or tablet computing device.

The manner in which the attachment portion connects the device to the programmable vibration source may take a variety of forms, but in some embodiments the device is formed of a material having resilience, and the attachment portion is dimensioned such that when the device is connected to the programmable vibration source the resilience of the material urges the attachment portion to grip the programmable vibration source. Thus, the inherent resilience (i.e. elasticity) of the material from which the attachment portion is made can be made use of to allow the device to grip the programmable vibration source. For example, where the attachment portion is dimensioned to closely match the dimensions of the part of the programmable vibration source to which it attaches, it may in fact be dimensioned very slightly smaller, such that a variety of push-fit coupling can be supported.

Alternatively, or in addition, the attachment portion may have some variety of mechanism which enables it to grip the programmable vibration source and in some embodiments the attachment portion comprises an adjustable holding device, wherein the adjustable holding device is configured to be opened to allow a part of the programmable vibration source to be inserted into the attachment portion and to be closed to grip the part of the programmable vibration source. This openable/closable attachment portion may for example make use of a sprung connection (broadly speaking in the manner that a bulldog clip is configured) or may for example comprise an adjustable screw-like device, with which the attachment portion may be tightened onto the programmable vibration source by the user.

As mentioned above the programmable vibration source may take a variety of forms, but in some embodiments it is a mobile telephone. The ubiquity of mobile telephones means that the device can be provided to a great number of different end users, who are then able to carry out vibration sensitivity assessment themselves, making use of a "programmable vibration source" which they happen to be carrying around in their pocket or handbag. Whilst the ability to vibrate of a mobile telephone is of course understood to be provided by the mobile telephone manufacturer as a notification mechanism for the user, the inventors of the present invention have realised that this ability to vibrate may be adapted, through the use of the present device, to provide a combined system (the present device connected to the mobile telephone) which is able to support vibration sensitivity assessment.

As will be discussed in more detail below the programmability of contemporary mobile telephones (also known as "smartphones") means that the coupling of the present device to a mobile telephone for the purposes of vibration sensitivity assessment provides a system for vibration sensitivity assessment which is eminently configurable (for example by downloading dedicated software (an "app") which the present techniques also provide) and with which the user will already be very familiar with interacting (for example by the touchscreen of such a device). Moreover, the data storage and data transmission capability of a mobile telephone can be made use of by the present techniques to gather data related to the vibration sensitivity assessment which has been carried out and either to store it in the telephone for later downloading (e.g. by a clinician at a next hospital visit) or directly transmit it to a centralised collection point (e.g. the hospital where the clinician works).

It should however be appreciated that the programmable vibration source need not be a mobile telephone. One useful alternative in some embodiments is that the programmable vibration source is a tablet computing device. It will be appreciated that a tablet computing device is in many regards very similar to a mobile telephone, in particular in the context of the present techniques that it is a programmable device and that it is capable of generating vibrations. In essence the only notable difference between a mobile telephone and tablet computing device in this context can be considered to be the overall size of the device. The greater size of a tablet computing device can be of benefit in the application of the present techniques due to the fact that the test subject may find the larger size of a tablet easier to interact with. Indeed it should be appreciated that in the context of the assessment of peripheral neuropathy, which may well be affecting the test subject's fingertips, the larger on-screen "buttons" which can be provided on tablet (than on a mobile telephone) may be easier for the test subject to use. Nevertheless, in this context it should also be noted that there is no requirement for the device to be used by the test subject themselves, and it could well be used instead by a clinician or carer, who applies the probe to the test location test subject's skin, and asks the test subject verbally if they are able to sense the vibrations. In the context of the clinical assessment of peripheral neuropathy it is known sometimes to be preferable for a third party to carry out the assessment, because this avoids the test subject knowing in advance whether vibrations are currently being generated, and the risk of this influencing their perception of those vibrations, or indeed telling themselves that they are able to perceive the vibrations, if they have a degree of denial about the extent of their own peripheral neuropathy.

Viewed from a second aspect the present techniques provide a system for vibration sensitivity assessment comprising: the device in any of the forms as described above; and the programmable vibration source.

As mentioned above, the vibration generating capability of the programmable vibration source may be that of, say, a mobile telephone or tablet. Accordingly in some embodiments the programmable vibration source is a portable computing device, wherein a capability of the portable computing device to generate the vibrations is provided as a notification mechanism for a user of the portable computing device.

The programmable vibration source, having the device attached, may support a vibration sensitivity assessment in a variety of ways. In some embodiments the programmable vibration source is configured to carry out a vibration sensitivity assessment procedure comprising: generating a predetermined intensity of the vibrations; and receiving user input indicating the test subject's ability to feel the predetermined intensity of vibrations at the test location. This procedure can be carried out by the execution of a suitable program loaded onto the programmable vibration source, for example in the form of a dedicated app for a mobile telephone, together with the user interacting with the programmable vibration source.

The vibration sensitivity assessment may only comprise a single step if appropriate, but in some embodiments the programmable vibration source is configured to carry out the vibration sensitivity assessment procedure in iterative steps comprising: performing the generating and receiving steps; increasing the predetermined intensity of the vibrations; and repeating the generating and receiving steps. In this manner the test subject can be assessed for a series of vibration intensities, to determine the threshold at which they begin to be able to feel the vibrations, i.e. the minimum vibration intensity which they can perceive.

The intensity of the vibrations may be varied in a number of ways, for example by varying the frequency and amplitude of the vibrations. However, it may be the case that the programmable vibration source to which the device is connected does not allow the programmer to vary at least one of the frequency and the amplitude of the vibrations which generates. For example, where the programmable vibration source is a mobile telephone, it may be the case that the programmer is only able to switch the vibration function of the mobile telephone on and off. In this situation the intensity of the vibrations for the purposes of the vibration sensitivity assessment may nevertheless be varied, by changing a pattern in time of when the vibration function is active. For example, whilst the vibration function could be continuously on for a predetermined period of time, it could also only be turned on in bursts for that period of time, the bursts themselves could vary in duration, and so on. In the context of a vibration sensitivity assessment it may for example be found that a pattern of bursts of vibration may be easier for the test subject to perceive than a continuous vibration for the same period of time. Accordingly, in some embodiments the programmable vibration source is configured to set the intensity of the vibrations by selecting an assertion pattern of the vibrations over a predetermined time period.

Other programmable vibration sources may nevertheless give fuller control over the vibration generation and hence in some embodiments the programmable vibration source is configured to set the intensity of the vibrations by selecting at least one of: a frequency of the vibrations; and an amplitude of the vibrations.

As mentioned above, the vibration sensitivity assessment may be carried out at different locations on the test subject's skin (e.g. fingertip, hand, knee, foot, toes etc.), and a test subject's ability to sense vibration at each of these locations may vary, even without any neuropathy. Accordingly, in some embodiments the programmable vibration source is configured to set the intensity of the vibrations in dependence on a selected test location on the test subject's skin.

In some embodiments the programmable vibration source is configured to store data comprising an indication of the user input in association with an indication of the predetermined intensity of vibrations. Thus, a convenient local logging of the result or results of the vibration sensitivity assessment may be provided.

The programmable vibration source may have the capability to transmit data and in some embodiments the programmable vibration source is configured to transmit to a predetermined recipient data comprising an indication of the user input in association with an indication of the predetermined intensity of vibrations. It may be useful for the result or results of the vibration sensitivity assessment to be transmitted, for example, to a hospital for immediate collation or review. This transmission may take place via any suitable communication functionality which the programmable vibration source has, for example via a telephone network (say via 3G or 4G capability), via a more localised network (say via a wireless Local Area Network), via a short range communication protocol (such as Bluetooth) and so on.

Some programmable vibration sources such as mobile phones are known to be able to determine their geographical location, for example with reference to Wi-Fi networks or global positioning satellites. This facility may be made use of by the present techniques to associate the geographical location of the user when the vibration sensitivity assessment was carried out with the results of that vibration sensitivity assessment. Accordingly in some embodiments the programmable vibration source is configured to perform geographical location determination, and wherein the programmable vibration source is configured to store or to transmit a geographical location indication in association with the stored or transmitted data.

The program (e.g. "app" on a mobile phone) which is executed by the programmable vibration source may further include presenting the user with questions related to the procedure, for example to gather information on: the identity of the user, their age, their sex, their answers to various questions about their general health, their answers to specific questions about neuropathy, their answers to questions relating to their ability to perform daily functions which may be affected by neuropathy, and so on. Accordingly in some embodiments the programmable vibration source is configured to store or to transmit received user responses to questions presented to the user by the programmable vibration source in association with the stored or transmitted data.

Viewed from a third aspect the present techniques provide software configured to cause a programmable vibration source to operate as the programmable vibration source in any of the forms described above.

Viewed from a fourth aspect the present techniques provide a computer readable storage medium on which is stored software configured to cause a programmable vibration source to operate as the programmable vibration source in any of the forms described above.

Viewed from the fifth aspect the present techniques provide a method of vibration sensitivity assessment comprising: connecting the device in any of the forms described above to the programmable vibration source; generating a predetermined intensity of the vibrations with the programmable vibration source; and receiving user input indicating the test subject's ability to feel the predetermined intensity of vibrations at the test location.

BRIEF DESCRIPTION OF THE DRAWINGS

The present techniques will be described further, by way of example only, with reference to embodiments thereof as illustrated in the accompanying drawings, in which:

Figure 6A:
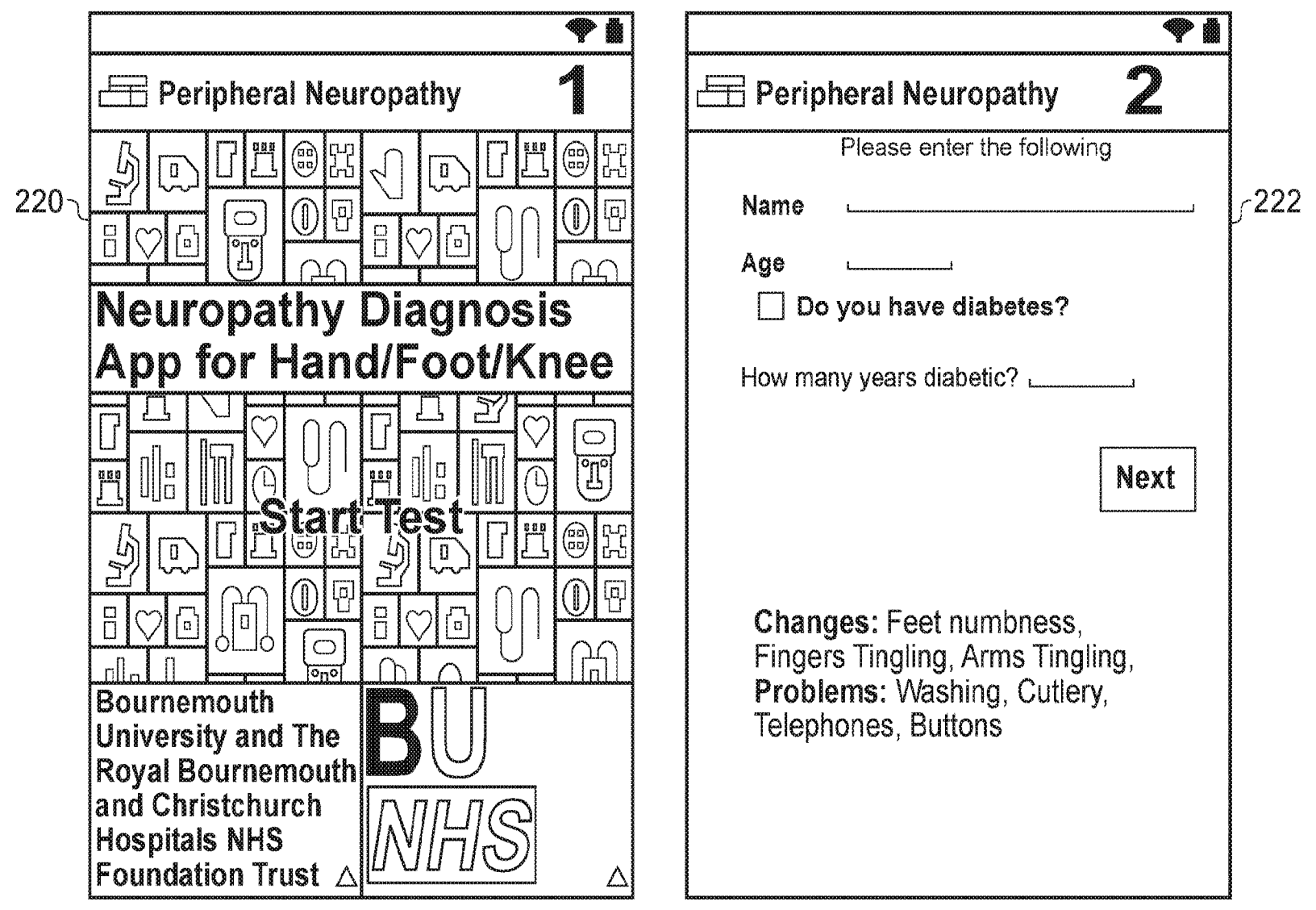
Figure 6B:
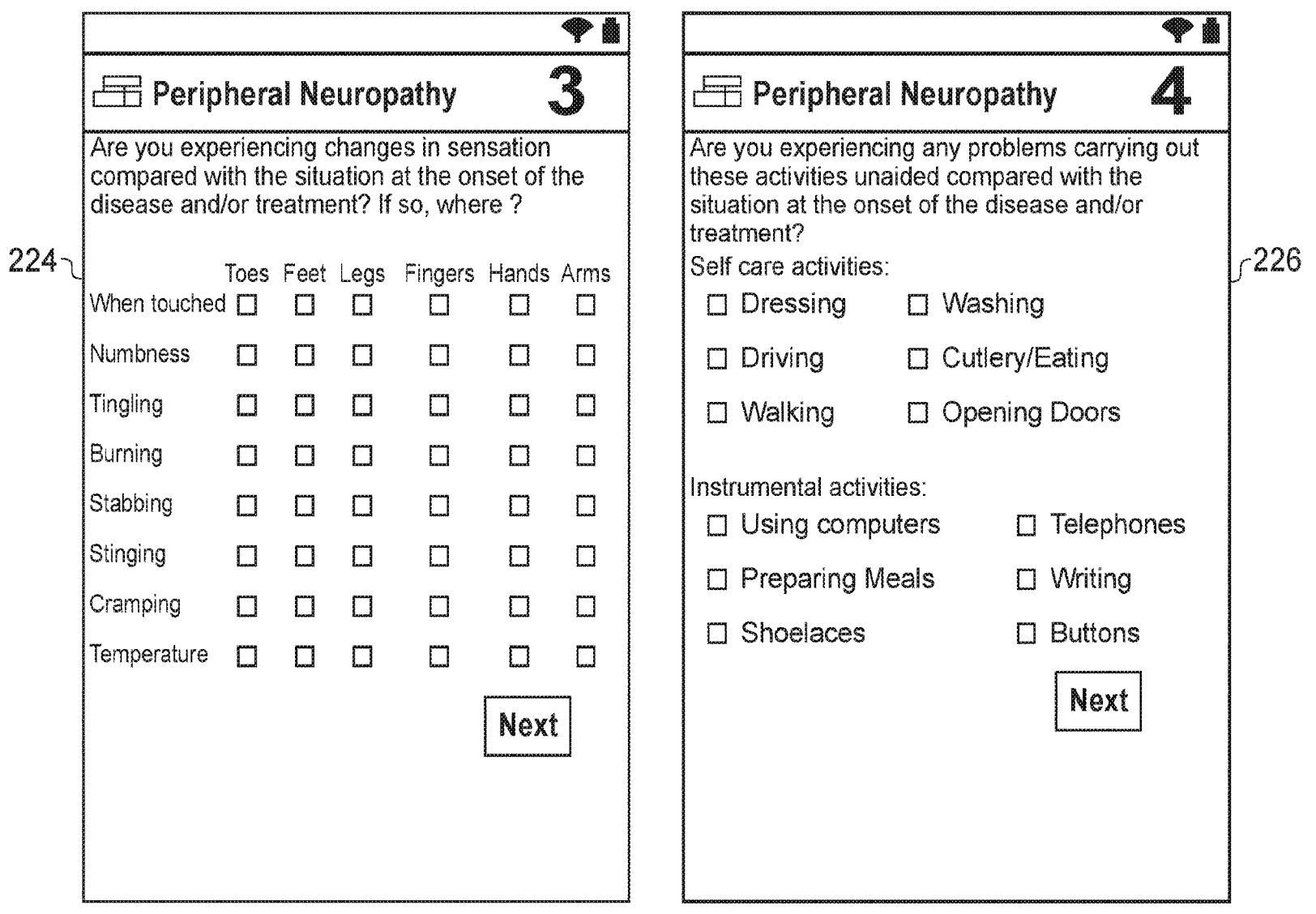

FIGS. 6A-6D show some example screen shots from an application running on a mobile telephone which provides the programmable vibration source in one embodiment.

DESCRIPTION OF EMBODIMENTS

Figure 1:
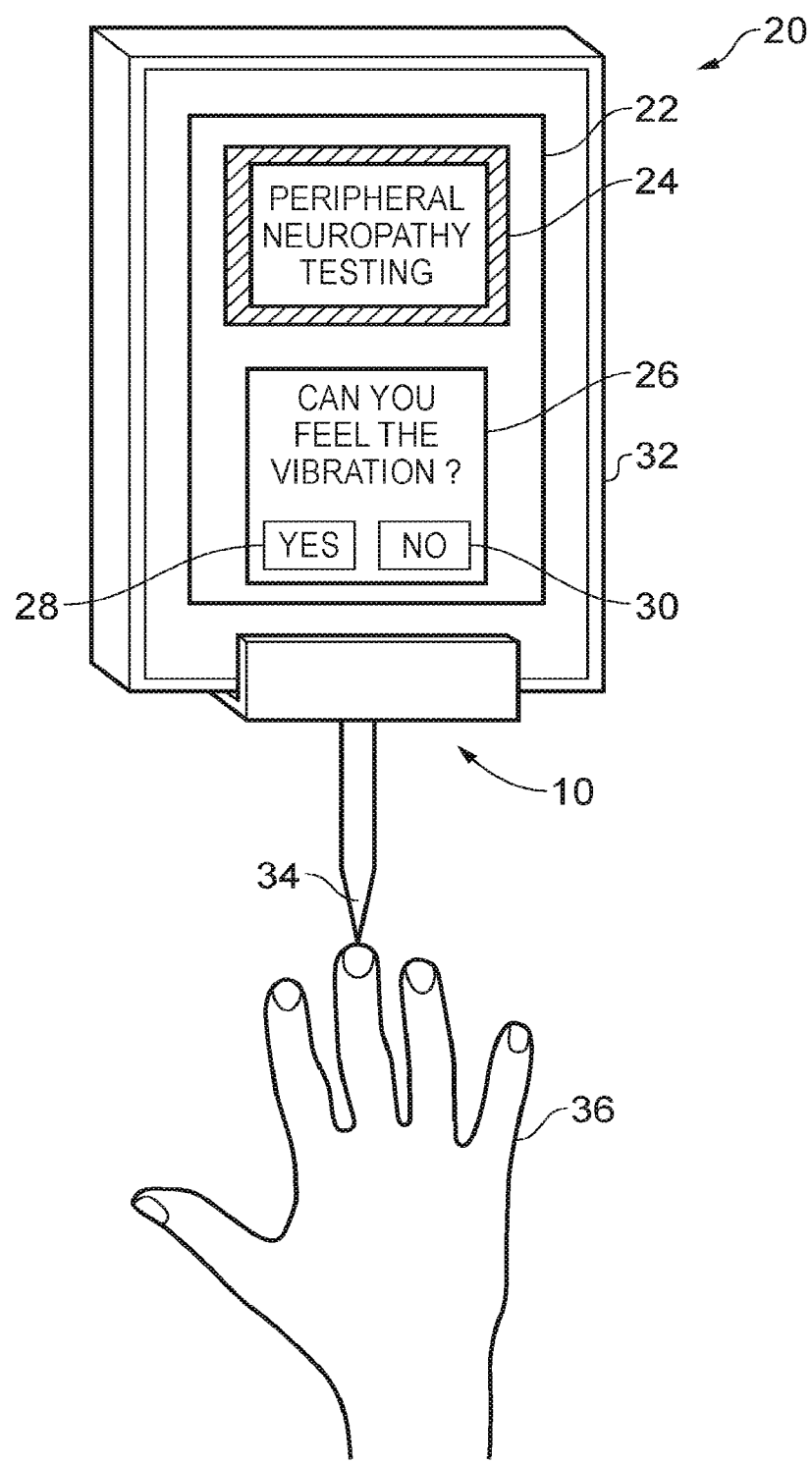
FIG. 1 shows a mobile telephone with the device according to one embodiment attached being applied to the fingertip of a hand in order to perform a vibration sensitivity assessment.

FIG. 1 shows the device 10 of one embodiment of the present techniques clipped onto a portable computing device 20, which in this example is a mobile telephone. The mobile phone 20 has been configured by downloading an application which is currently running on it. This application enables a vibration sensitivity assessment to be carried out for the purpose of peripheral neuropathy testing. As can be seen in FIG. 1, the screen 22 of the mobile telephone 20 is currently displaying a logo 24 of the peripheral neuropathy testing application and a box 26 which is asking the user if they can currently feel the vibration being generated. Two answer buttons "yes" and "no" 28 and 30 are provided. The device 10 shown in FIG. 1 clips onto the bottom of the mobile telephone 20 and in particular makes close contact with the metallic rim 32 of the mobile telephone, in order to efficiently transmit vibrations generated by the mobile telephone through the device and to the test location of the subject being assessed. The pointed tip 34 of the device 10 is shown in contact with the fingertip of a test subject's hand 36.

Figure 2A:
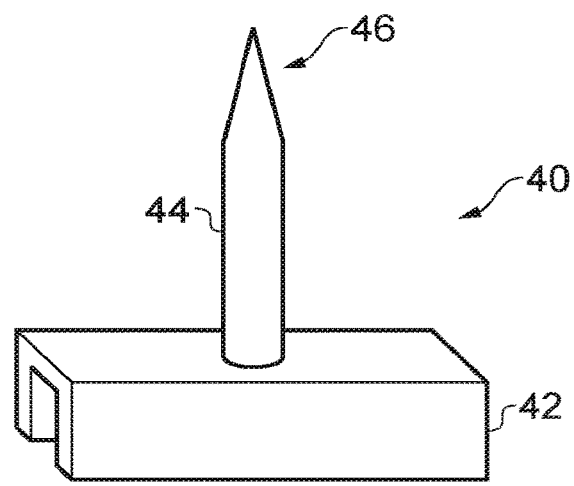
FIG. 2A illustrates a device with a probe which ends in a tapered point in one embodiment.
Figure 2B:
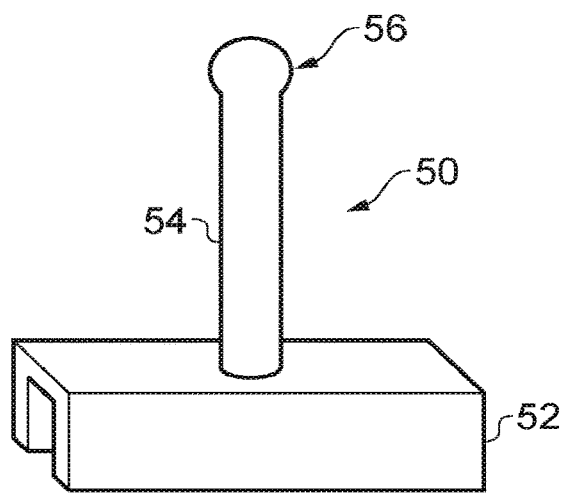
FIG. 2B shows a device which ends in a rounded, substantially spherical end in one embodiment.
Figure 2D:
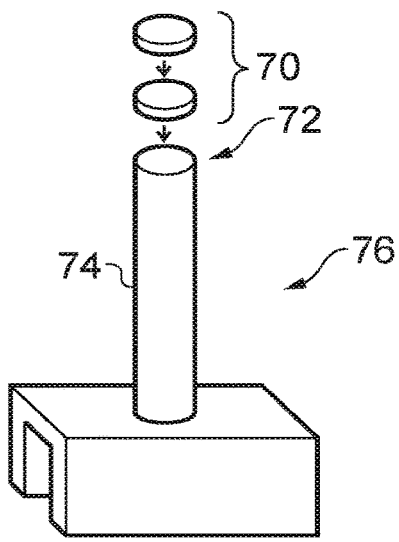
FIG. 2D shows a device with a probe onto which one or more pads are attachable in one embodiment.
Figure 2C:
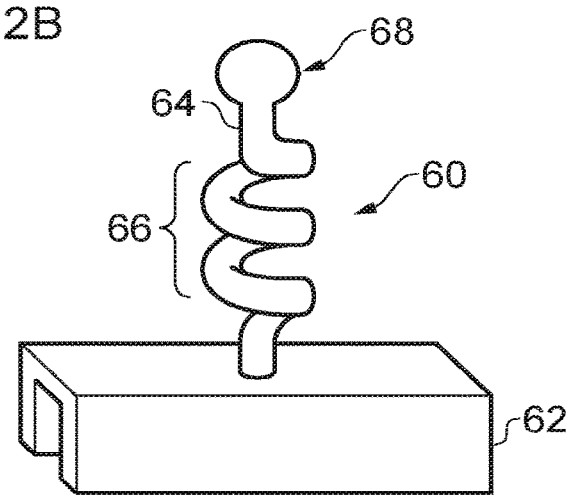
FIG. 2C shows a device having a helical shaft which terminates in a substantially spherical end in one embodiment.

FIGS. 2A-E shows some different configurations of the device in different embodiments. The device 40 of FIG. 2A comprises an attachment portion 42 and a probe 44, the tip 46 of which tapers to a point. The device 50 shown in FIG. 2B has an attachment portion 52, and a probe 54 which ends in a rounded portion 56. The device 60 shown in FIG. 2C has an attachment portion 62 and a probe 64 which comprises a helical portion 66. The end of the probe 68 is provided by a ball-like portion. In dependence on the programmable vibration source (for example a mobile phone) to which the device 60 is intended to be attached, the helical portion 66 is configured in terms of its size, helical pitch, overall dimensions, and material such that it may dampen the vibrations generated by the programmable vibration source or instead resonate with them. Where the minimum vibrational intensity of the programmable vibration source is known to be greater than that which is desired to be used in a vibration sensitivity assessment, then the helical portion can be configured to dampen the vibrations and reduce their intensity. Alternatively, where the maximum vibration intensity which can be provided by the programmable vibration source is known to be relatively weak, selection of appropriate configuration of the helical portion in order to resonate with those vibrations can help to modify the manner in which the tip of the probe moves when in contact with the test subject's skin, to make those vibrations more easily perceivable. Another technique for dampening the vibrations generated by the programmable vibration source is shown in FIG. 2D where one or two pads 70 are shown being applied to the tip 72 of the probe 74 of a device 76 in one embodiment. The material chosen for providing the pads 70 can be varied in order to vary their vibration dampening ability.

Figure 2E:
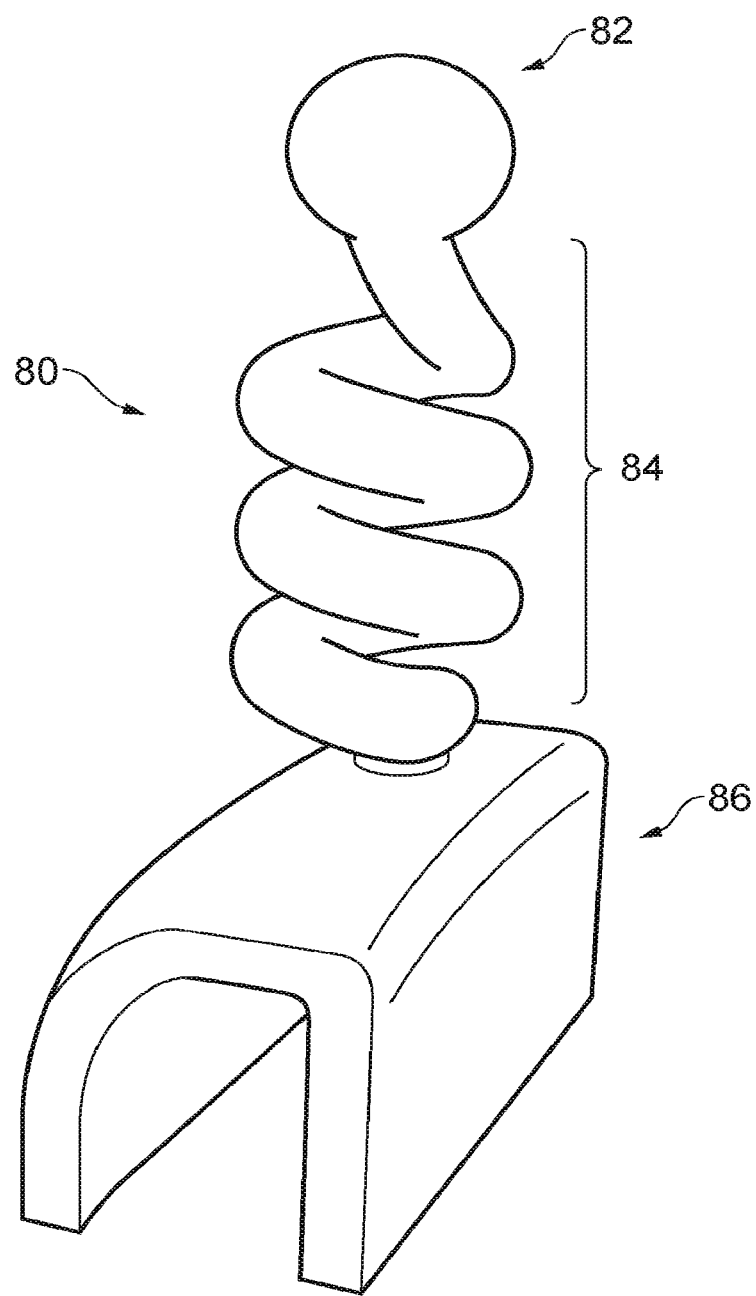
FIG. 2E shows a computer-aided-design representation of a device in one embodiment.

FIG. 2E shows a computer-aided-design representation of a device 80 in one embodiment. Similarly to the device shown in FIG. 2C, the device 80 comprises an approximately spherical tip 82, a helical probe portion 84 and an attachment portion 86. As can be seen in FIG. 2E, the attachment portion 86 of the device 80 has a particular internal shape, namely being flat on one side and slightly rounded on the other, this being so that the attachment portion very closely matches the external dimensions of the particular mobile phone to which it is designed to be attached. Indeed, in order to determine this shape the mobile phone has been 3D scanned using an optical laser 3D scanning machine to capture the precise size and shape of the mobile phone contours in the relevant portion to which the device should be attached. This 3D scanning method provides that the attachment portion 86 fits very closely onto the mobile phone. The computer-aided-design mobile shown in FIG. 2E has then been generated following this process using a stereo lithography format. The model is generated to closely surround the shape of the mobile phone with a 3 mm wall thickness. The device 80 has then been 3D printed in order to very closely reproduce the physical item from the 3D model.

Figure 3A:
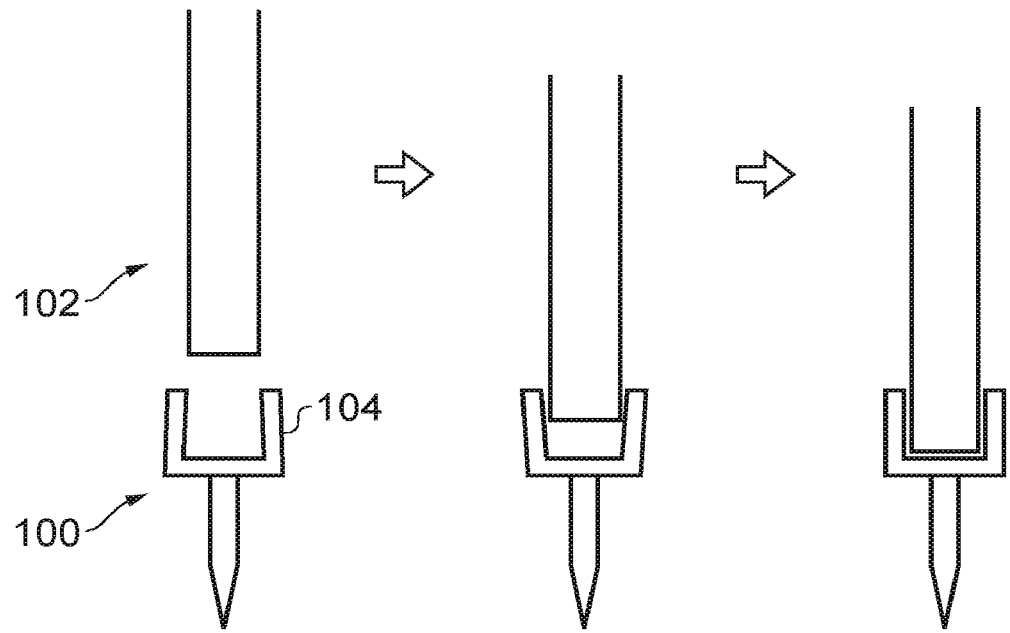
FIG. 3A schematically illustrates the connection of a device in one embodiment to a programmable vibration source which uses the resilience of the material of the device to cause the device to grip the programmable vibration source.
Figure 3B:
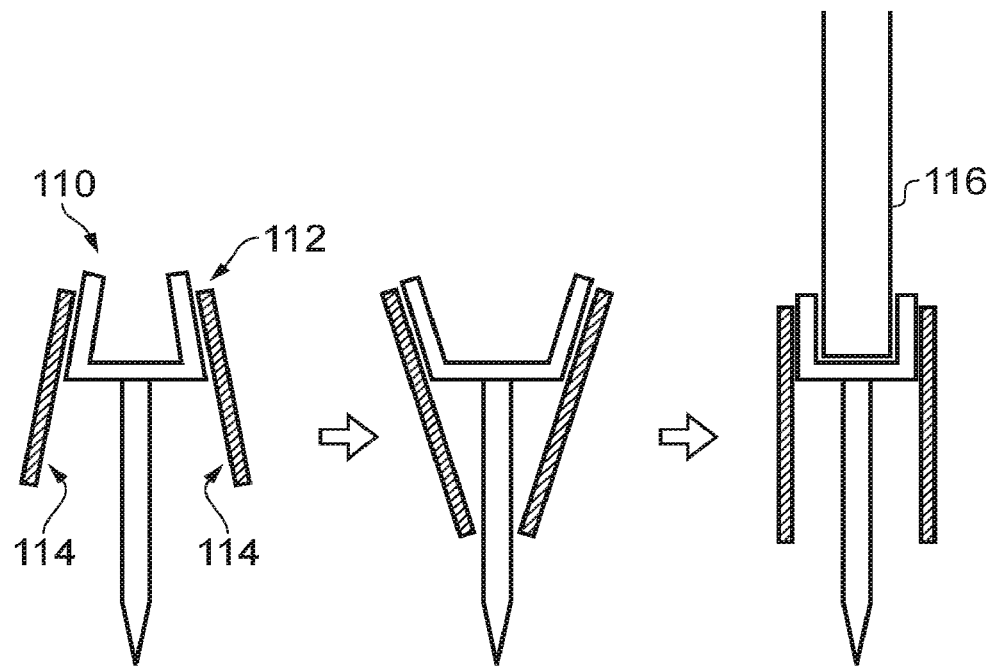
FIG. 3B schematically illustrates a device in one embodiment which uses a clip-like mechanism to cause the device to grip the programmable vibration source.
Figure 3C:
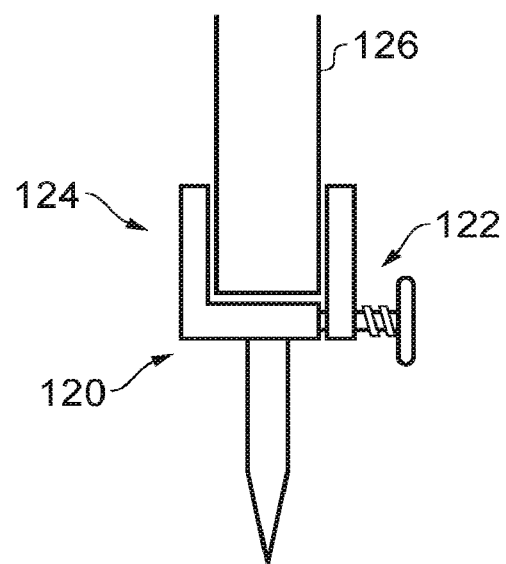
FIG. 3C illustrates a device in one embodiment in which a screw-like mechanism is used to cause the device to grip the programmable vibration source.

The attachment portion of the device may hold the programmable vibration source (e.g. mobile phone) in a number of ways, some examples of which are shown in FIGS. 3A-C. In the example of FIG. 3A, the device 100 is shown clipping onto a mobile telephone 102 where each is shown in a side view. The three stages shown in FIG. 3A illustrate that the resilience of the material from which the device 100 is manufactured is used in order to generate the required grip of the device 100 onto the mobile telephone 102. Thus, whilst the internal shape of the attachment portion 104 of the device 100 is configured to match the external shape of the end of the mobile telephone 102 very closely, the middle stage of connection shown in FIG. 3A illustrates (slightly exaggerated for clarity) the sides of the attachment portion being deformed very slightly in their position before in the final stage of connection closely holding the end of the mobile phone.

FIG. 3B shows another example device 110 in which the attachment portion 112 is intentionally created such that its sides have a resting position (unattached to a mobile phone) in which the sides point slightly inwards. Optional arms 114 are also shown in FIG. 3B with which the user, by squeezing these together, can cause the attachment portion 112 of the device 110 to splay open, before the mobile phone is inserted into it. Once the mobile phone is inserted into it, as can be seen in the final stage of FIG. 3B, the arms are released and the spring-like nature of the sides of the attachment portion cause the attachment portion to grip the mobile telephone 116. FIG. 3C illustrates a device 120, which has a screwing mechanism 122, which enables the user to tighten the attachment portion 124 of the device 120 onto the end of the mobile telephone 126.

Figure 4:
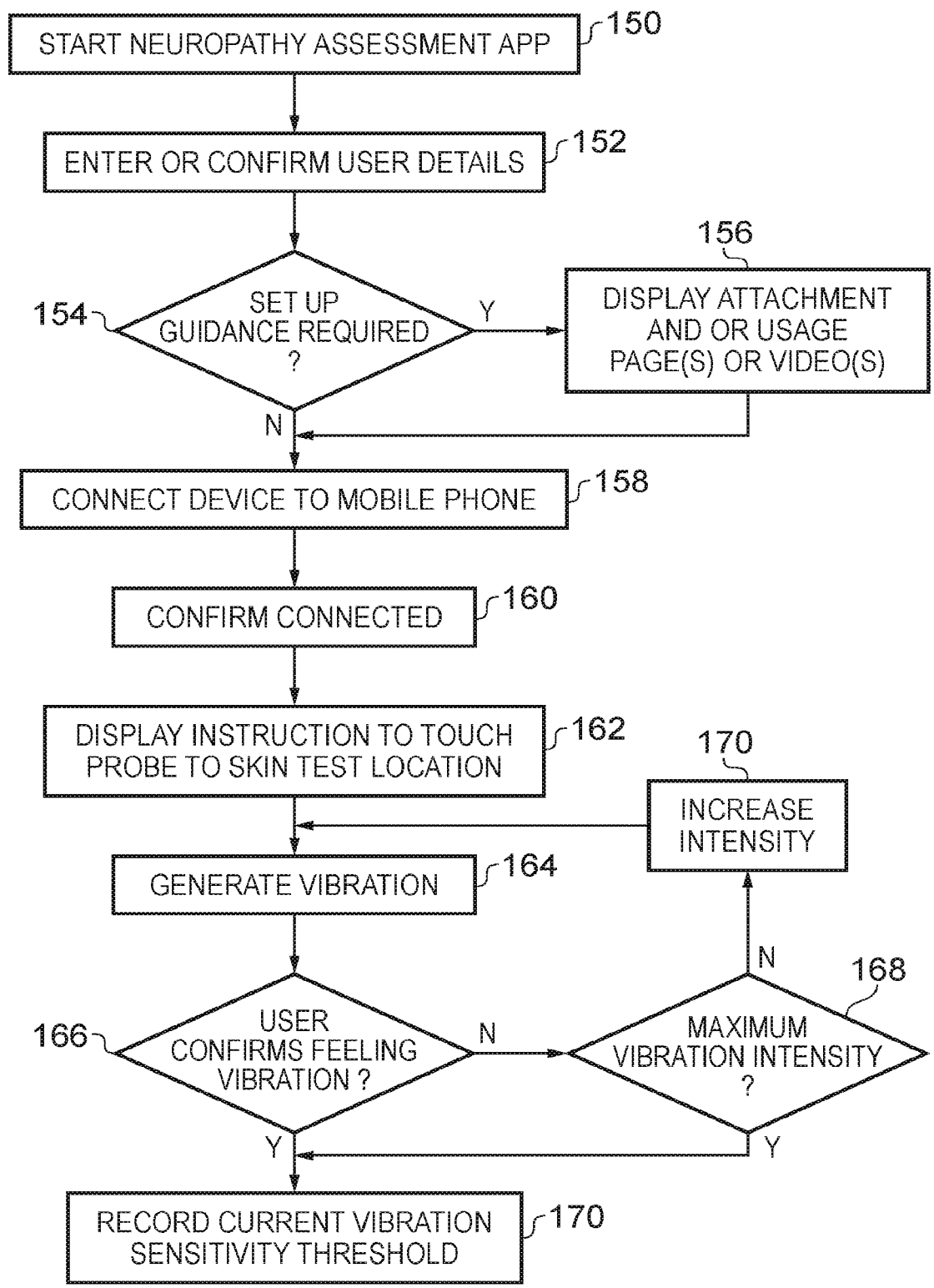
FIG. 4 shows a sequence of steps which are taken in one embodiment in order to carry out a vibration sensitivity assessment using the device attached to a mobile telephone.

Whatever form the device takes, and by whatever means it is connected to a programmable vibration source, a vibration sensitivity assessment procedure may then be carried out, one example of which is shown by the steps of FIG. 4. In this example, a mobile phone is used as the programmable vibration source onto which a dedicated application has been loaded, to enable the vibration sensitivity (neuropathy) assessment to be carried out. Thus, at a first step 150, the user starts the neuropathy assessment application. Then as a first stage, at step 152, the user enters their details or merely confirms these if they are already stored. Then, at step 154, the application asks the user if set up guidance for carrying out the neuropathy assessment is required. If it is then at step 156 the mobile phone can display information, for example either statically or using a video which forms part of the application, to instruct the user about how to attach the device to the mobile phone and other aspects of how it is then to be used in the assessment. Then at step 158 the user connects the device to the mobile phone, and at step 160 confirms when they have done this. At step 162 the application instructs the user to touch the probe of the device to the desired skin test location, for example the tip of one of their toes. Then at step 164 the application causes the mobile phone to vibrate, this initially being done at the lowest intensity of vibration provided. As mentioned above, this may be by varying the frequency and/or amplitude of the vibration generation, but in the context of a mobile phone which does not allow an application to do this, this may also be provided by selection of the pattern of vibrations generated. Then at step 166 the user is asked to confirm whether or not they can feel this vibration. If they cannot, then the flow proceeds to step 168 where it is determined if the maximum vibration intensity that can be generated has already been reached. Clearly at a first iteration of the procedure this will not happen. Whilst further levels of intensity are available then the flow proceeds back via step 170 at which the vibration intensity is increased by a step and a vibration is once again generated at step 164 and the user asked at step 166 if they can perceive it. Once either the maximum vibration intensity has been reached at step 168 or when the user confirms that they can feel the generated vibration of the step 166 then the flow proceeds to step 170 where the mobile phone records the current vibration intensity as the patient's current vibration sensitivity threshold, i.e. the weakest intensity of vibration which they are currently able to feel at the selected skin test location.

Figure 5:
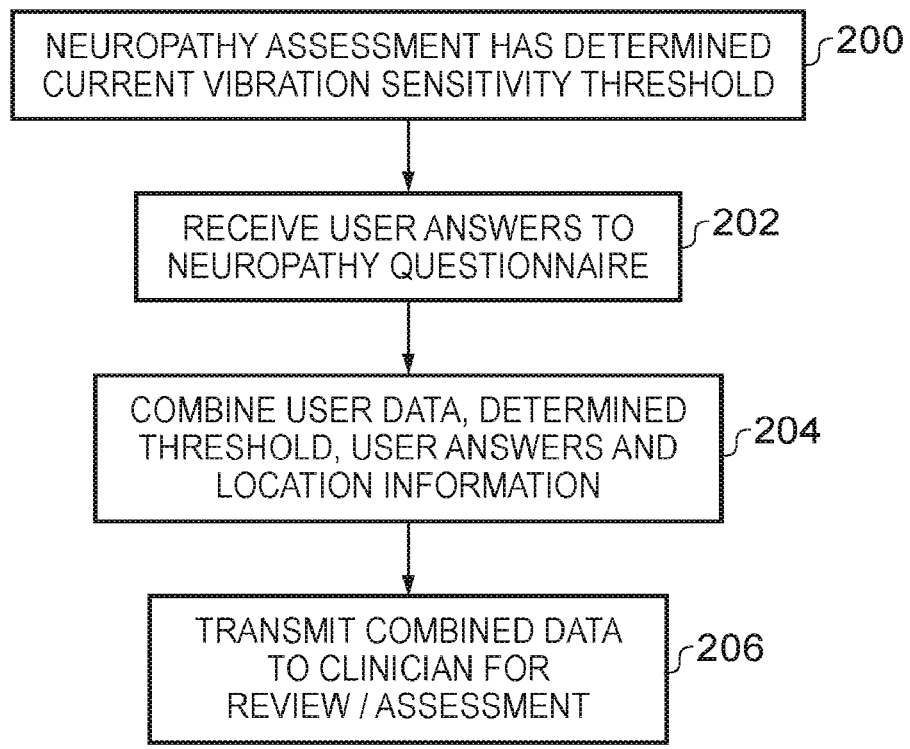
FIG. 5 shows a sequence of steps which are taken by a programmable vibration source in one embodiment to transmit results from a vibration sensitivity assessment to a clinician for review.
Figure 6C:
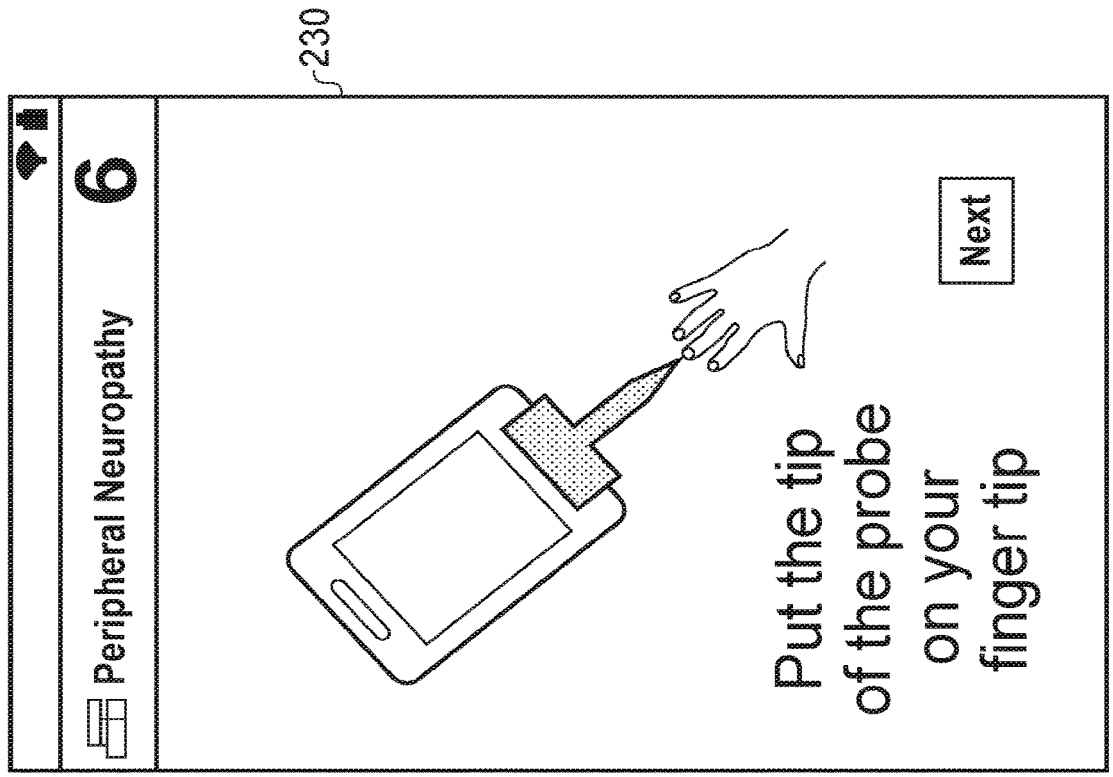
Figure 6C:
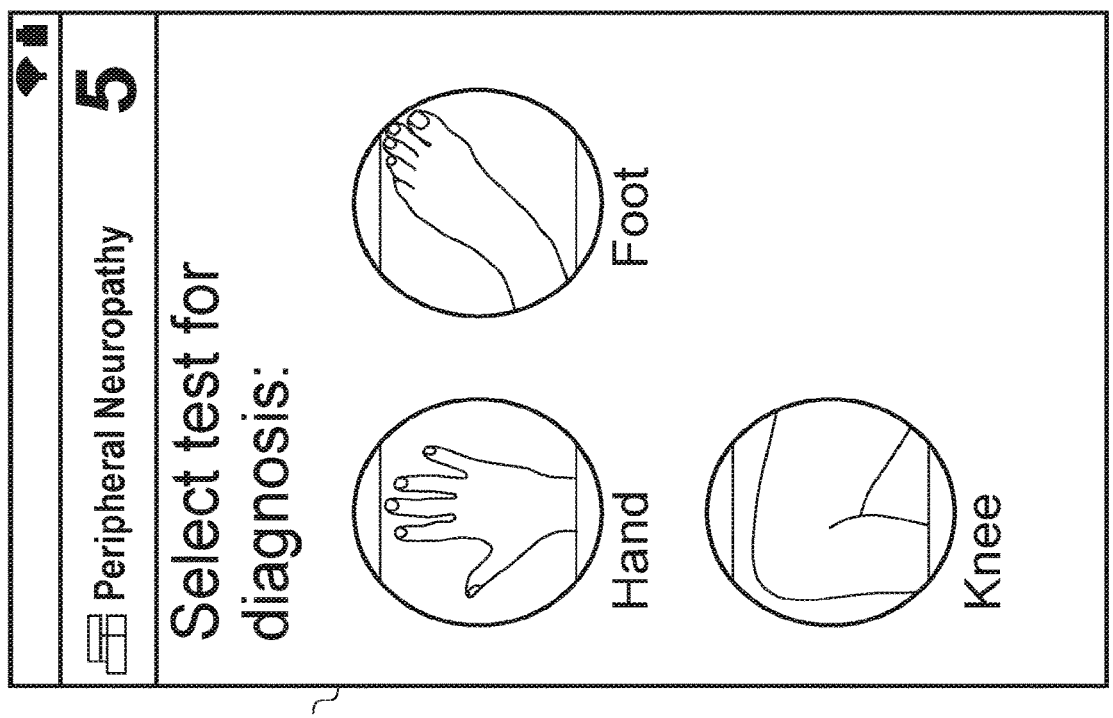
Figure 6D:
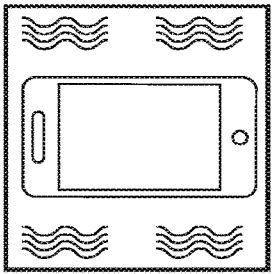

FIG. 5 illustrates an example sequence of steps which are carried out by the neuropathy assessment application in processing the data which is gathers through interaction with the user in performing the vibration sensitivity assessment (neuropathy test). Once the assessment procedure has determined the current vibration sensitivity threshold for a user at one or more skin test locations (step 200) then the application generates various questions for the user to answer in the form of a questionnaire, gathering information related to their own perception of the progression of their neuropathy, their general health and any other information which may be useful to a clinician seeking to assess them. The application receives the user's answers to these questions at step 202. Then at step 204 the application combines the initial user data (identity), the determined vibration sensitivity threshold, the user's answers to the neuropathy questionnaire and location information derived from the mobile phone's ability to determine its geographical location (for example using Wi-Fi or GPS), this set of data then being bundled together in an appropriate format for storage and transmission. Then at step 206, the combined data is transmitted to a clinician for review and assessment. This transmission may take place in a number of different ways, depending on the particular capabilities of, say, the mobile phone. For example, this data might form an attachment to an email, or could be transmitted by a dedicated information transmission protocol.

FIGS. 6A-D show a sequence of screen shots from a neuropathy diagnosis application in one embodiment. As can be seen from the first screen shot 220, the assessment is intended to be carried out on a patient's hand, foot or knee. Screenshot 222 shows some initial identity data about the patient being requested. Screenshot 224 shows a questionnaire in the form of tick boxes, via which information about changes in sensation for the patient are gathered. Screenshot 226 shows further questions being asked of the patient regarding whether they have found they are experiencing problems carrying out particular daily activities. The test itself begins as shown by screenshot 228 with the user indicating which part of the body should be tested. Then screenshot 230 shows the application instructing the user to apply the probe of the device to the appropriate test location. The screenshot 232 shows the mobile phone vibrating at an intensity of 50% and the user being asked if they can feel this or not. Finally screenshot 234 shows the results of the peripheral neuropathy test being displayed, ready to be transmitted to a clinician.

Figure 7:
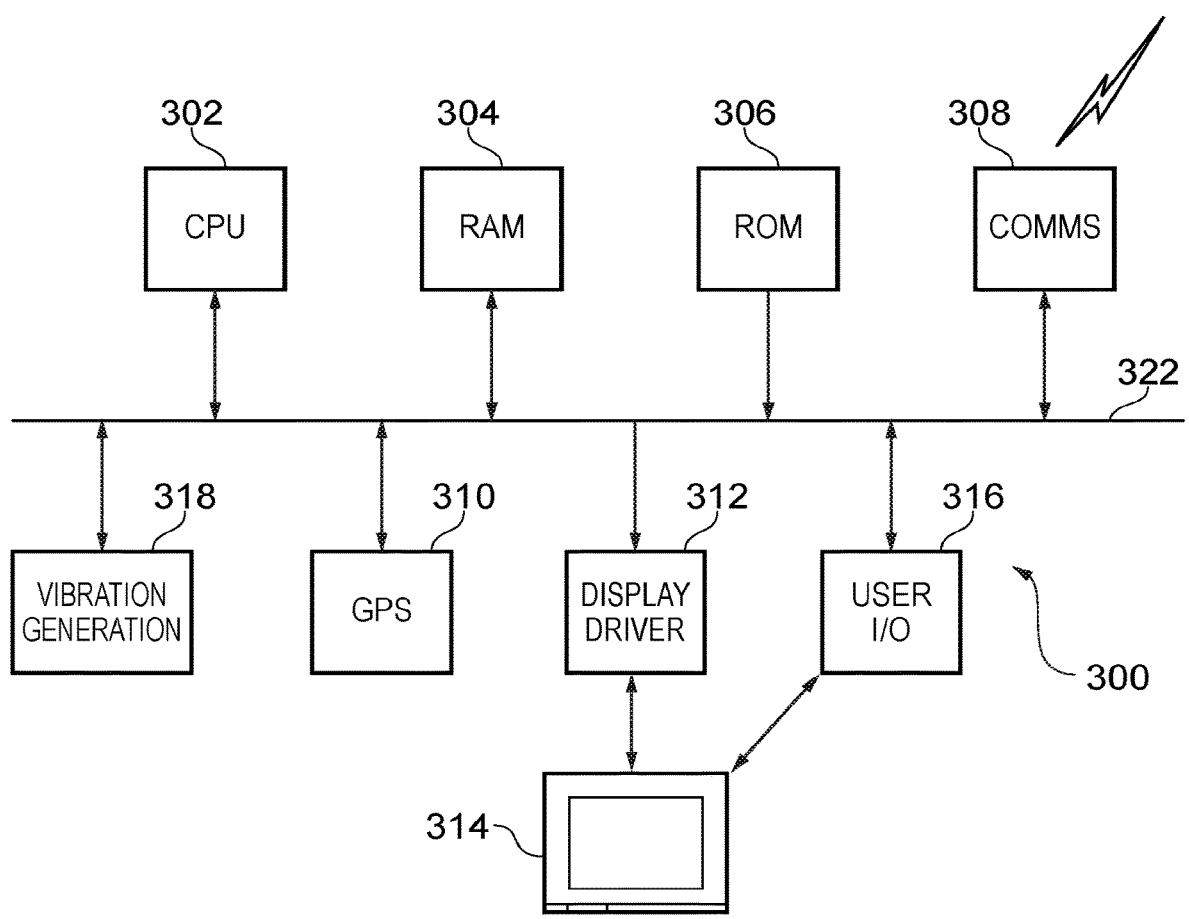
FIG. 7 schematically illustrates the configuration of a computing device in one embodiment.

FIG. 7 schematically illustrates a programmable device 300 of the type that may be used to implement the above described techniques. As mentioned above, in the context of the present techniques this could for example be a mobile telephone or tablet. The programmable computing device 300 includes a central processing unit 302, a random access memory 304 and a read only memory 306, connected together via bus 322. It also further comprises a wireless communications unit 208, a GPS unit 310, a display driver 312 and a user input/output circuit 316. Both the display driver 312 and the user I/O 316 are connected to the touchscreen 314. A vibration generation unit 318 is also connected to the bus 322 and under the control of the CPU 302 can generate vibrations for use in the above described techniques.

In operation, such as when running the above-described vibration assessment application, the central processing unit 302 will execute computer program instructions that may for example be stored in the random access memory 304 and/or the read only memory 306. These program instructions (e.g. in the form of an "app") may have been downloaded via the wireless communications unit 208, for example via a WiFi network or by a mobile network. The results of the processing performed may be displayed to the user via the display driver 312 and touchscreen 214. User inputs for controlling the operation of the device 300 may be received via the touchscreen 314 and the user I/O interface 316. It will be appreciated that the computer program could be written in a variety of different computer languages. When operating under the control of an appropriate computer program, the device 200 can support the above described techniques. The architecture of the device 300 could vary considerably and FIG. 7 is only one example.

In the present application, the words "configured to . . . " or "arranged to" are used to mean that an element of an apparatus has a configuration able to carry out the defined operation. "Configured to" or "arranged to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. A system for clinical vibration sensitivity assessment comprising:
a device comprising:
an attachment portion configured to detachably clip the device onto a mobile telephone, wherein an internal shape of the attachment portion is configured closely to match an external shape of the mobile telephone; and
a probe, attached to the attachment portion, and configured to be applied to a test location on a test subject's skin and to convey vibrations generated by the mobile telephone to the test location; and
the mobile telephone,
wherein the mobile telephone is configured to carry out a vibration sensitivity assessment procedure comprising:
a generating step to generate a predetermined intensity of the vibrations; and
a receiving step to receive user input indicating the test subject's ability to feel the predetermined intensity of the vibrations at the test location,
wherein the mobile telephone is configured to carry out the vibration sensitivity assessment procedure in iterative steps comprising:
performing the generating and receiving steps;
increasing the predetermined intensity of the vibrations; and
repeating the generating step and the receiving step;
wherein the mobile telephone is configured to set the predetermined intensity of the vibrations in dependence on a selected test location on the test subject's skin.

2. The system as claimed in claim 1, wherein the mobile telephone is a portable computing device, wherein a capability of the portable computing device to generate the vibrations is provided as a notification mechanism for a user of the portable computing device.

3. The system as claimed in claim 1, wherein the mobile telephone is configured to set the predetermined intensity of the vibrations by selecting an assertion pattern of the vibrations over a predetermined time period.

4. The system as claimed in claim 1, wherein the mobile telephone is configured to store data comprising an indication of the user input in association with an indication of the predetermined intensity of the vibrations.

5. The system as claimed in claim 4, wherein the mobile telephone is configured to store or to transmit received user responses to questions presented to the user by the mobile telephone in association with the stored data.

6. A method of clinical vibration sensitivity assessment, the method comprising:
connecting a device to a mobile telephone,
wherein the device comprises an attachment portion configured to detachably clip the device onto the mobile telephone, wherein an internal shape of the attachment portion is configured closely to match an external shape of the mobile telephone, and wherein a probe, attached to the attachment portion, is configured to be applied to a test location on a test subject's skin and to convey vibrations generated by the mobile telephone to the test location;

applying the probe of the device to the test location on the test subject's skin;

generating a predetermined intensity of the vibrations with the mobile telephone; and receiving user input indicating the test subject's ability to feel the predetermined intensity of the vibrations at the test location, and further carrying out the vibration sensitivity assessment in iterative steps comprising:

performing the generating and the receiving;

increasing the predetermined intensity of the vibrations; and repeating the generating and the receiving;

wherein the mobile telephone is configured to set the predetermined intensity of the vibrations in dependence on a selected test location on the test subject's skin.

7. The system of claim 1, wherein the mobile telephone is configured to set the predetermined intensity of the vibrations by selecting at least one of:

a frequency of the vibrations; or an amplitude of the vibrations.

8. The system of claim 4, wherein the mobile telephone is configured to transmit the data comprising the indication of the user input in association with the indication of the predetermined intensity of the vibrations.

9. The system of claim 8, wherein the mobile telephone is further configured to:

perform geographical location determination; and store or transmit a geographical location indication in association with the stored or transmitted data.

10. The system of claim 1, wherein the probe comprises a helical portion.

11. The system of claim 10, wherein the helical portion is configured to dampen vibrations generated by the mobile telephone.

12. The system of claim 10, wherein the helical portion is configured to resonate with vibrations generated by the mobile telephone.

13. The system of claim 1, wherein a proximal end of the probe connects to the attachment portion and a distal end of the probe tapers to a point.

14. The system of claim 1, wherein a proximal end of the probe connects to the attachment portion and a distal end of the probe is rounded.

15. The system of claim 1, wherein the attachment portion comprises an adjustable holding device, wherein the adjustable holding device is configured to be opened to allow a part of the mobile telephone to be inserted into the attachment portion and to be closed to grip the part of a programmable vibration source.

16. The system of claim 1, wherein the attachment portion is configured to directly contact a metallic rim of the mobile telephone.

17. The system of claim 1, wherein the device is formed of a material having resilience, and the attachment portion is dimensioned such that when the device is connected to the mobile telephone the resilience of the material urges the attachment portion to grip the mobile telephone.

18. The method of claim 6, further comprising:

setting the predetermined intensity of the vibrations by selecting an assertion pattern of the vibrations over a predetermined time period.

19. The method of claim 6, further comprising:

storing data comprising an indication of the user input in association with an indication of the predetermined intensity of the vibrations;

presenting, by the mobile telephone, questions to the user in association with the stored data; and storing or transmitting user responses to the questions.

* * * * *